(12) United States Patent
Cloutier

(10) Patent No.: US 6,671,000 B1
(45) Date of Patent: Dec. 30, 2003

(54) GAMMA CALIBRATION

(75) Inventor: Laurence Cloutier, Tournefeuille (FR)

(73) Assignee: Autodesk Canada Inc., Quebec (CA)

( * ) Notice: Subject to any disclaimer, the term of this patent is extended or adjusted under 35 U.S.C. 154(b) by 476 days.

(21) Appl. No.: 09/675,917

(22) Filed: Sep. 29, 2000

(30) Foreign Application Priority Data

Mar. 29, 2000 (GB) .............................................. 0007448

(51) Int. Cl.[7] .................................................. H04N 9/69
(52) U.S. Cl. ...................................... 348/675; 348/722
(58) Field of Search ................................. 348/675, 674, 348/676, 677, 722; 358/518, 506; H04N 5/14, 5/202, 9/69

(56) References Cited

U.S. PATENT DOCUMENTS 5,049,985 A * 9/1991 Outa .......................... 358/530
5,353,239 A * 10/1994 Kashiwagi ................... 382/276
5,483,259 A * 1/1996 Sachs .......................... 345/600
6,266,103 B1 * 7/2001 Barton et al. ............... 348/675

* cited by examiner

Primary Examiner—Michael H. Lee
(74) Attorney, Agent, or Firm—Gates & Cooper LLP

(57) ABSTRACT

An image processing system includes a frame store, a processing means and a monitor. The frame store stores a sequence of images from a film or video clip that will eventually be transferred to film for viewing in a theater. The image sequence is processed and possibly combined with other clips, resulting in changes to the color balance, intensity and contrast of the output clip. The image processing system, the monitor and the process of eventual transfer to film, have non-linear transfer characteristics, including gamma characteristics. These are combined in a single look-up table in a graphics card, so that images displayed on the monitor have an appearance matching that of the same images when viewed in the theater.

27 Claims, 13 Drawing Sheets

```
for  (x=0;x<256;x++)
   {
      LUT_R=LUT 1_R[LUT 2_R[LUT 3_R[x]]];
      LUT_G=LUT 1_G[LUT 2_G[LUT 3_G[x]]];
      LUT_B=LUT 1_B[LUT 2_B[LUT 3_B[x]]];
   }
```

*Fig.13*

```
for    (x=0,y=0;x<256;x++)
   for    (Z=0;Z<256;Z++,Y++)
      {
         _LUT_update(RED,y,LUT_R[x]);
         _LUT_update(GREEN,y,LUT_G[x]);
         _LUT_update(BLUE,y,LUT_B[x]);
      }
```

*Fig.14*

GAMMA CALIBRATION

FIELD OF THE INVENTION

The present invention relates to satisfying a plurality of gamma requirements for displaying images on a monitor, and in particular relates to processing images for a computer monitor such that images previewed on the monitor have the same appearance as they would have after being transferred to film and viewed in a theater.

INTRODUCTION TO THE INVENTION

Image transducers convert between patterns of light intensities and patterns of electrical charge. The relationship between light intensity at a point on an image and its corresponding electrical signal, expressed as a voltage, is non-linear. In a television camera, for example, a small increase in light intensity at high levels will result in a smaller change in voltage than the same increase in intensity at low light levels. A television monitor containing a cathode ray tube has the opposite characteristic: an increase in electron gun voltage has an exponential relationship with the intensity of light emitted by phosphors at the screen.

Each such transducer's characteristic may be defined by a response curve, representing the transfer function of the transducer. For many transducers these response curves can be expressed mathematically as an exponent applied to a numerical argument representing the transducer's input normalised to a range of zero to one. This exponent has come to be known in the image processing industry as gamma.

Historically, television cameras and monitors were designed to have compatible gamma characteristics. In early systems, the camera had a gamma of 0.4545, and the monitor had a gamma of about 2.8. This results in an overall gamma of 2.8×0.4545=1.27.

The overall gamma of an image processing system is the exponent which broadly defines the relationship between the intensity of light reaching the viewer's eye and the intensity of light that entered the camera. In a theoretically perfect system, an overall gamma value of 1.0 would reproduce image intensities exactly as they would be seen by the naked eye. However, it has been shown that images viewed artificially benefit from an overall gamma value of greater than one.

For television, the overall gamma value is usually 1.27, but overall gamma is used to characterise many types of image processing system, including film. For cinematographic film, the required overall gamma is 1.5. When images destined for film are being edited digitally it is necessary to preview the results of editing on a monitor prior to their conversion back to film. Unless compensation steps are taken, images will appear differently on the monitor than on the resulting film. This is mostly due to the difference in gamma characteristics between cinematographic film and CRT monitors.

In a typical digital editing environment, a film scanner digitizes film images that are subsequently transferred to a digital frame store. The digital frame store comprises an array of hard disk drives. A computer system accesses and manipulates the images in the frame store in real time. The resulting image data is supplied to a film recorder, which then transfers the images back onto film. In order for the correct effects and edit decisions to be made during manipulation of the image data, it is necessary to ensure that images viewed on a computer monitor appear as they will look in the resulting film.

SUMMARY OF THE INVENTION

It is an aim of the present invention to provide an improved method of modifying image data for display on a monitor, so that images displayed on the monitor are consistent with gamma requirements for film.

The present invention provides apparatus for processing image data, comprising instruction storage means, central processing means and graphical processing means. The graphical processing means is arranged to receive image data and display resulting images on a color monitor. The graphical processing means includes look-up means for transforming the gamma format of the image data supplied to it. The color monitor requires a first gamma transformation to satisfy calibration requirement and the image data requires the second gamma transformation to satisfy a compensation requirement. Instruction storage means includes instructions for the central processing means to perform processing steps, that comprise combining the first and second transformations to define transformation data in the look-up means and supplying images to the look-up means such that images displayed on the monitor are transformed in response to the second gamma transformation but not said first gamma transformation.

BRIEF DESCRIPTION OF THE DRAWINGS

FIG. 13 details source code for instructions executed by the central processing unit shown in FIG. 3 when performing the combining process shown in FIG. 8; and FIG. 14 details source code for instructions executed by the central processing unit shown in FIG. 3 when downloading data generated in accordance with FIG. 13 to the graphics card shown in FIG. 3.

DETAILED DESCRIPTION OF THE PREFERRED EMBODIMENT

Figure 1:
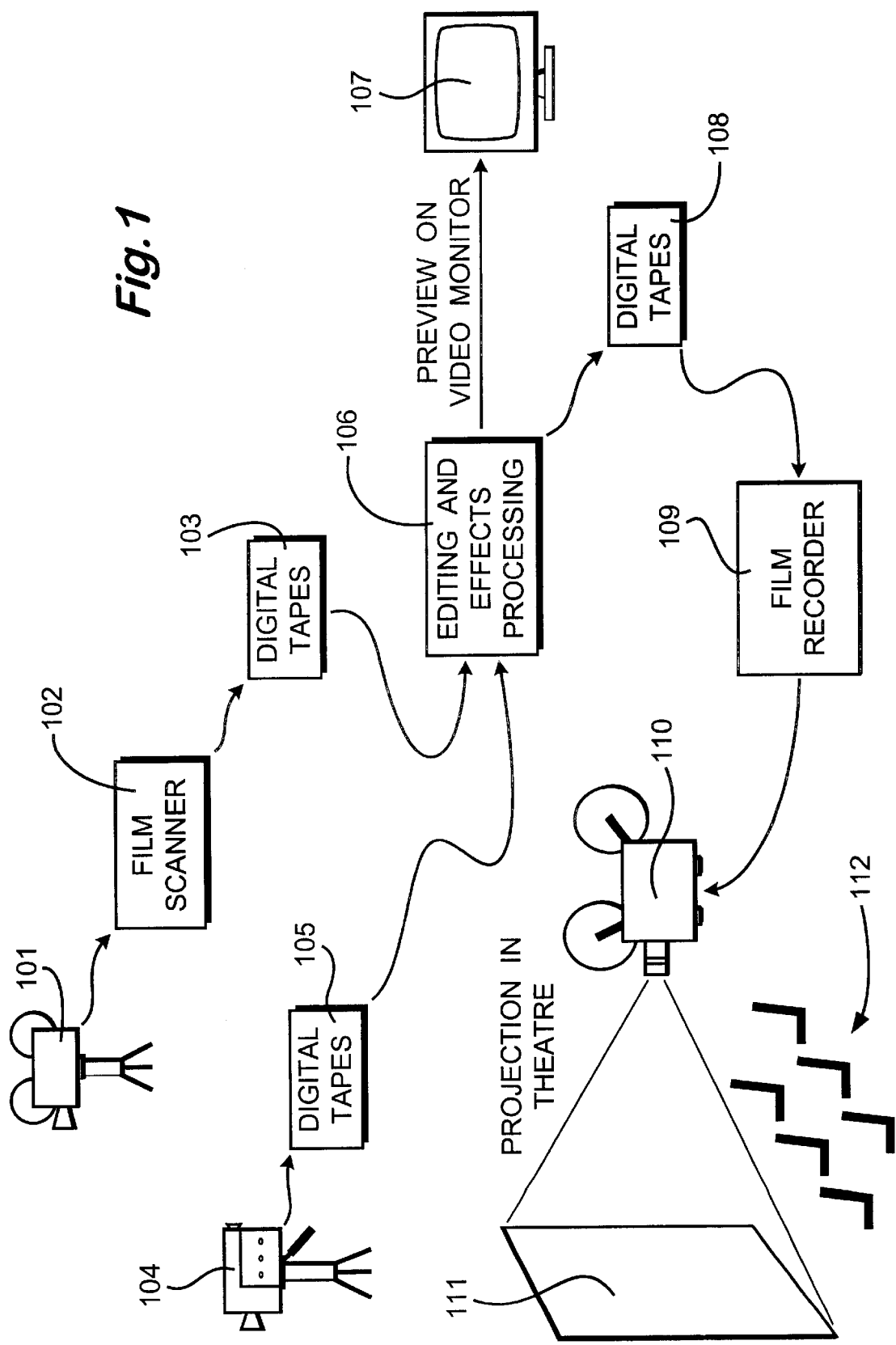
FIG. 1 illustrates apparatus and steps performed while editing images originating on film or video that are intended for eventual viewing as film images in a theater, including a film camera, a video camera, a monitor, an image processing system and a film recorder.

A sequence of image processing events is summarised in FIG. 1. A camera 101 is used to record a scene onto cinematographic film. The resulting film is converted into digital form by a film scanner 102, that has an output in the form of digitally encoded magnetic tapes 103. An alternative source of image data is a digital video camera 104, that directly generates digital data onto digital video tape 105. A digital editing and effects processing environment 106 includes facilities for modifying image data supplied in the form of digital tapes 103 and or 105.

Typical operations carried out in the processing environment 106 include processing to apply special effects, such as a color warping, color keying etc and to perform edits. While editing and effects processing 106 is applied, the results of edit and effects processes are viewed on a video monitor 107. Effects and edits are tried out in several variations before a preferred effect or edit point is finalised. In this way, the operator of the editing and effects processing environment 106 may create a high quality image sequence. Once a sequence has been finalised, image data is transferred to digital tapes 108. In the event that this data is intended for film, the tapes 108 are supplied to a film recorder 109 which scans the images onto cinematographic film. The film is eventually placed in a projector 110 for projection onto a screen 111 in a theater 112.

Figure 2:
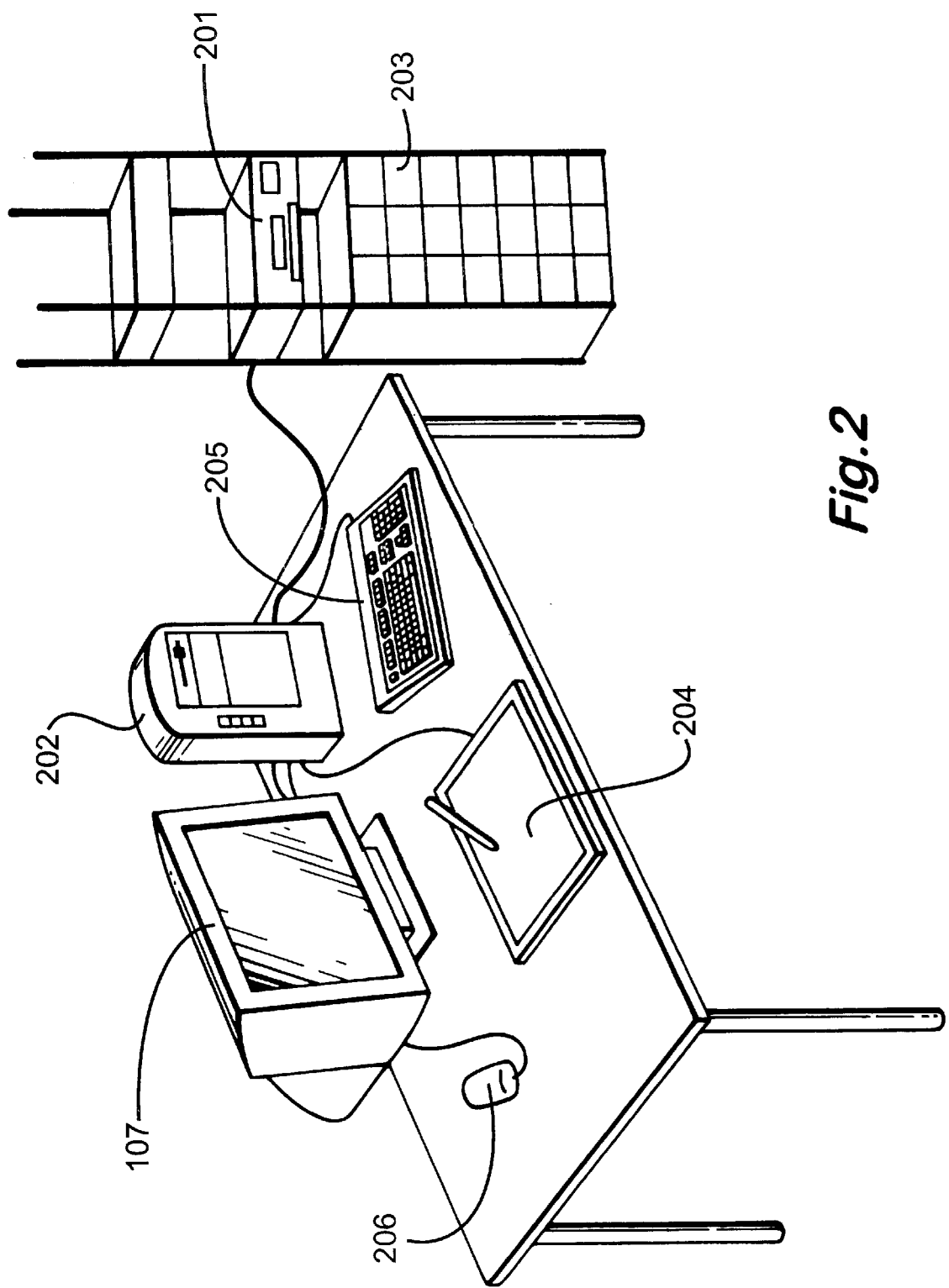
FIG. 2 details the image processing system shown in FIG. 1, including a computer.

FIG. 2 details equipment used to perform the editing and effects processing 106 shown in FIG. 1. A digital tape player 201 receives digital tapes 103, 105 containing image data. This data is transferred via a Silicon Graphics Octane (™) computer 202 to a redundant array of independent disks (RAID) 203. Once located on the RAID 203, image data may be manipulated efficiently and in real time by the computer 202. An operator controls image editing and processing operations via a stylus-operated graphics tablet 204 and a keyboard 205 that are connected to the computer 202. A colorimeter 206, having a similar size and appearance to a computer mouse, may be fixed to the centre of the screen of the monitor 107 during a monitor calibration procedure.

The operator interacts with and modifies image data stored on the RAID 203 until an image sequence has been finalised. At this point, final image data is transferred to tapes 108 inserted in the digital tape player 201, for eventual transfer to the film recorder 109.

Figure 3:
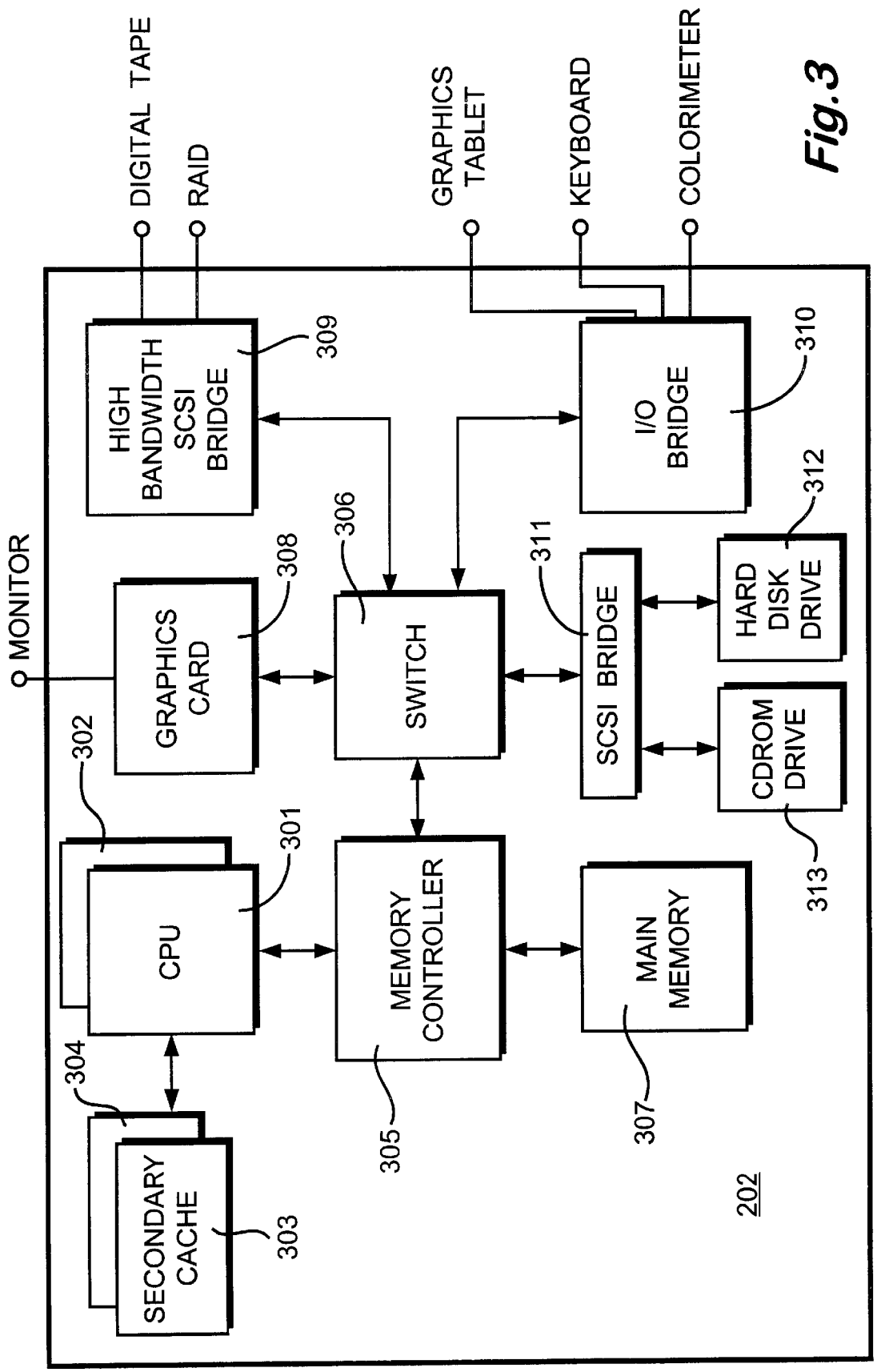
FIG. 3 details components of the computer shown in FIG. 2, including a central processing unit, a main memory, a graphics card and a CDROM drive.

The Silicon Graphics Octane computer 202 shown in FIG. 2 is detailed in FIG. 3. A pair of MIPS R12000 central processing units (CPU) 301 and 302 include primary instruction and data cache memories. The two CPUs 301 and 302 communicate with secondary cache memories 303 and 304, that are one megabyte each in capacity. The CPUs 301 and 302 communicate, via a memory controller 305, with a switch 306 and a main memory 307. The main memory consists of two gigabytes of dynamic RAM. The switch facilitates connectivity between several of the attached circuits. A graphics card 308 receives instructions and data from the switch 306 in order to render image data for display on the monitor 107. A high bandwidth SCSI interface 309 provides connectivity to the digital tape recorder 201 and the RAID 203. An input/output interface 310 facilitates connections with the graphics tablet 204, the keyboard 205 and the colorimeter 206. A second SCSI bridge 311 provides connectivity to an internal hard disk drive 312 and a CDROM drive 313.

A CDROM inserted into the CDROM drive 313 may contain instructions for performing image editing and processing upon image data stored in the RAID 202. Instructions on the CDROM may be installed on the hard disk drive 312 for subsequent use whenever the computer is switched on. Installation is facilitated by installation instructions, which may also be supplied on the CDROM, and which define steps performed by the CPUs 301 and 302 necessary to ensure appropriate installation of the editing and processing instructions on the hard disk. Thereafter, instructions from the hard disk 312 may be loaded into main memory 307 for execution by the CPUs 301 and 302 whenever image editing and effects processing is required. In an alternative embodiment, instructions may be downloaded via a network, such as the internet.

Figure 4:
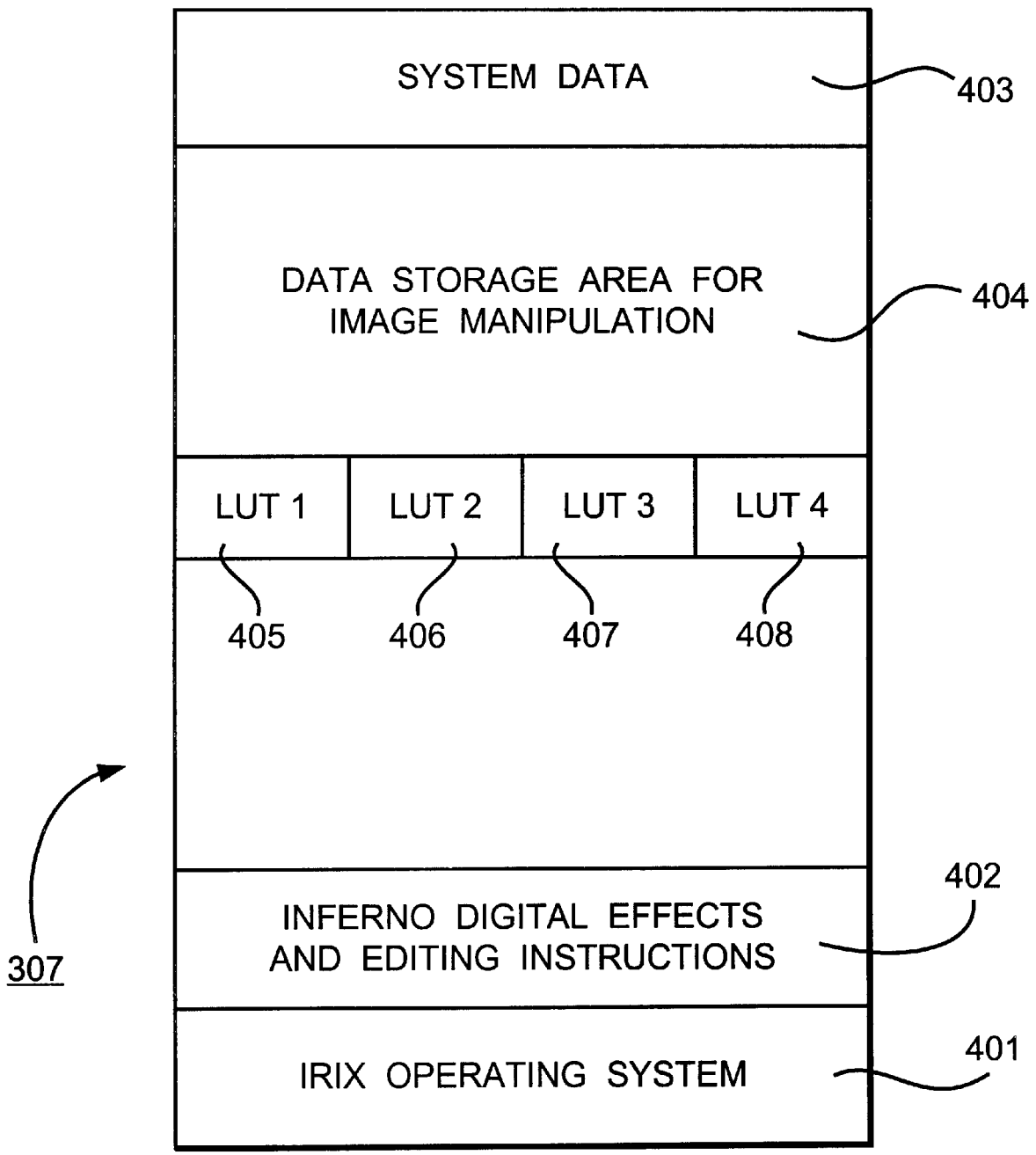
FIG. 4 details contents of the main memory shown in FIG. 3 during image processing, including digital effects and editing instructions and look-up tables.

The main memory 307 stores instructions and data necessary for the operation of the computer 202. Contents of the main memory during execution of editing and effects processing instructions are detailed in FIG. 4. A Silicon Graphics Irix (™) operating system 401 provides common functionality for applications running on the computer 202. Digital image effects, editing and processing instructions 402 are substantially based upon the Inferno (™) system available from the present applicant. System data 403 includes data necessary for the correct functioning of the operating system 401, A data storage area 404 provides temporary storage for image manipulation by the image processing instructions 402. Four look-up tables (LUT) 405 to 409 are stored in main memory. Each LUT comprises two hundred and fifty-six words of data that will be used in the invention.

Figure 5:
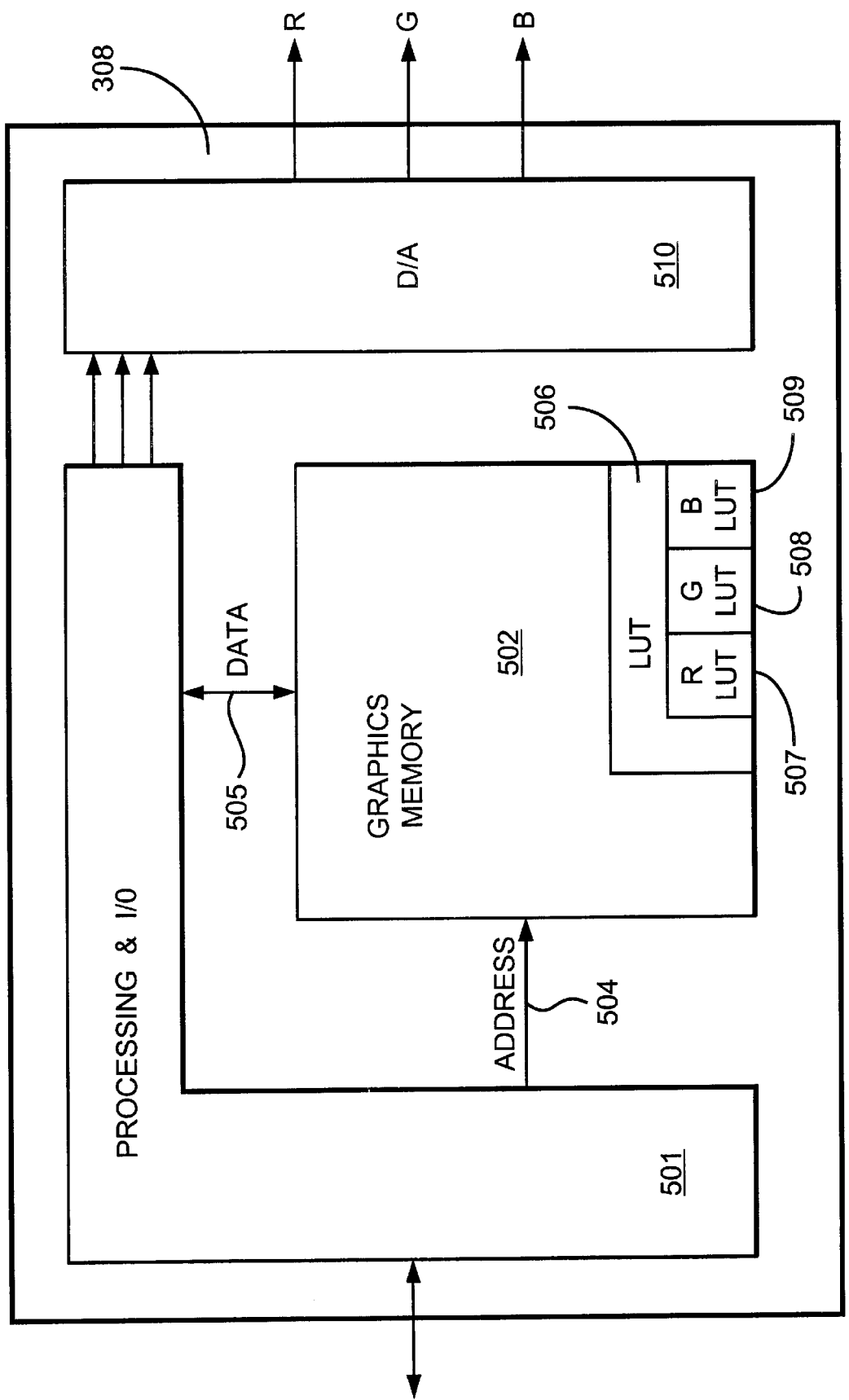
FIG. 5 details components of the graphics card shown in FIG. 3.

The graphics card shown in FIG. 3 is detailed in FIG. 5. Processing and input output circuitry 501 co-ordinates processing of image data, and communication between its internal processors, the switch 306 and a graphics memory 502. The graphics memory 502 is connected to the processing and input/output circuitry 501 via data and address connections 504 and 505 respectively. The graphics memory 502 includes a hardware look-up table (LUT) 506, comprising three look-up tables, one each for red 507, green 508 and blue 509. Each of these look-up tables has two hundred and fifty-six words of data. Each word comprises twelve bits. The processing and input/output circuitry 501 co-ordinates data access with the look-up table 506. The LUT 506 may be initialised with data for each red green and blue component. Thereafter, image data is transformed in accordance with data contained in the red, green and blue portions of the LUT 506.

Details of image data transformation by the LUT 506 will now be explained with reference to the red LUT 507. This contains two hundred and fifty-six words of data. Access within the red LUT 507 is defined by a twelve bit address, which is capable of selecting any one of the 256 data locations as a source or destination of data. If the location addressed by zero contains data of value zero, location one contains value one, location two contains value two and so on, up to two hundred and fifty-six, the LUT may be considered as performing no color transformation at all. Data supplied as an address to it generates the same value as data. If, however, the data stored in the LUT deviates from this linear relationship, another transfer function can be implemented. The LUT's in graphics cards are usually implemented in dedicated hardware, and are intended to provide real time adjustments to color that are achieved more quickly by modifying the LUTs than by modifying the color value at each individual pixel in an image or series of images.

The output of each LUT 507, 508 and 509 is multiplexed to a digital to analog circuit 510, which generates red, green and blue analog signals that are supplied to the monitor 107. Most of the time, addresses supplied to the LUT 506 are color values requiring transformation. However, in order to set up a transformation function in the LUT 506, addresses are used to write specific data to locations in any or all of the red, green and blue LUTs 507 to 509, hence the transfer of data 505 between the LUT 506 and the processing circuit 501 is bi-directional.

The creative decisions made in the editing and effects processing environment 106 rely on there being a close similarity between the images viewed on the monitor 107 and the images seen by an audience in the theater 112. An important difference between film and video formats is in their gamma characteristics.

Figure 6:
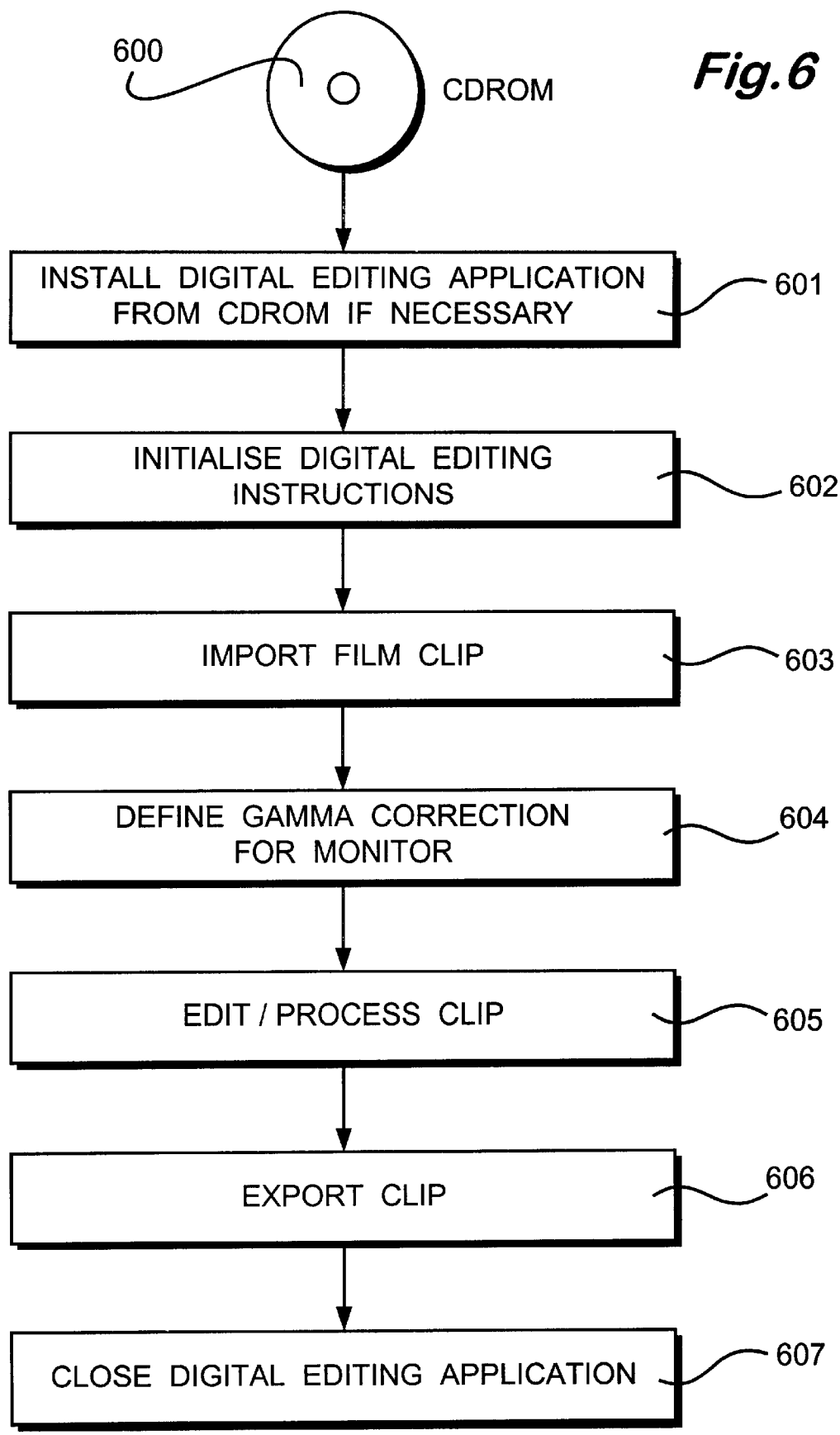
FIG. 6 summarises steps performed by the digital effects and editing instructions shown in FIG. 4, including a step of defining gamma correction for a monitor.

The steps performed by an operator using the digital editing environment shown in FIG. 2 are summarised in FIG. 6. A CD ROM 600 contains digital editing and effects instructions 402. These may be installed on the hard disk drive 312, if necessary, at step 601. At step 602 the digital editing instructions 402 are initialised, and these are loaded into main memory 307. At step 603 a film clip is imported by reading image data from digital tapes 103 via the tape recorder 201 onto the RAID 203.

At step 604 the gamma correction for the monitor 107 is defined. Instructions for this process are included in the editing and effects instructions 402.

At step 605 the clip is edited and processed using editing and effects instructions 402. At step 606 the finished clip, comprising a finalised image sequence, is transferred to digital tapes 108, and at step 607 the digital editing application is closed.

Figure 7:
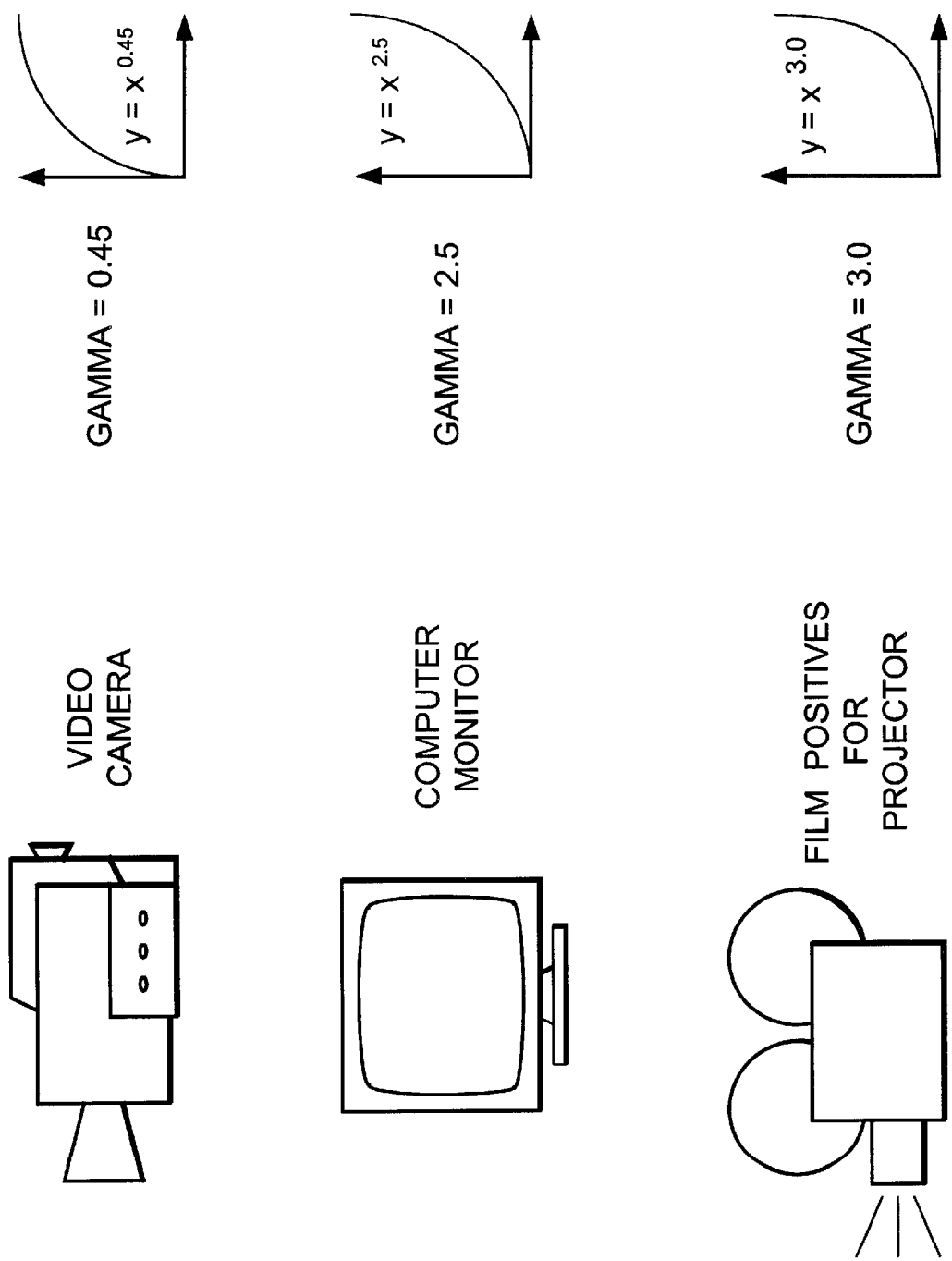
FIG. 7 illustrates gamma characteristics of several items of apparatus shown in FIG. 1.

Gamma characteristics are illustrated in FIG. 7. Image data generated by the video camera 104 retains its natural gamma of 0.45, as this type of data is usually displayed, without gamma compensation, on television screens having a gamma of 2.5. Thus, video data has a gamma value that must be taken into consideration when this type of data is being processed for eventual use in film. The process of shooting a scene onto negative film results in a typical gamma value of 0.6. However compensation for this may be done in the film scanner 102 when a linear output format is requested. If this is done, the film data received by the editing and effects processing system 106 has a gamma value of 1.0.

A video monitor, such as monitor 107, has a gamma value of 2.5. Thus, the light emitted by the phosphors on a cathode ray tube is proportional to a normalised representation of the voltage supplied to the electron guns, raised to the power 2.5.

When generating a film positive, as is done in the film scanner 109, the corresponding gamma is 3.0.

During image processing 106, the overall gamma is affected by the chain of processes starting with the light entering the camera 101 or 104 and ending with the light emitted from the cathode ray tube's phosphors 107. At the time of projection, however, the overall gamma is affected by the chain of processes again starting with the camera 101 or 104 but ending with the light appearing on the cinema screen 111.

In both instances it is required that the overall gamma be the same and equal to 1.5. In order to satisfy this overall gamma requirement, images viewed on the monitor 107 must be modified by applying a gamma correction function.

Figure 8:
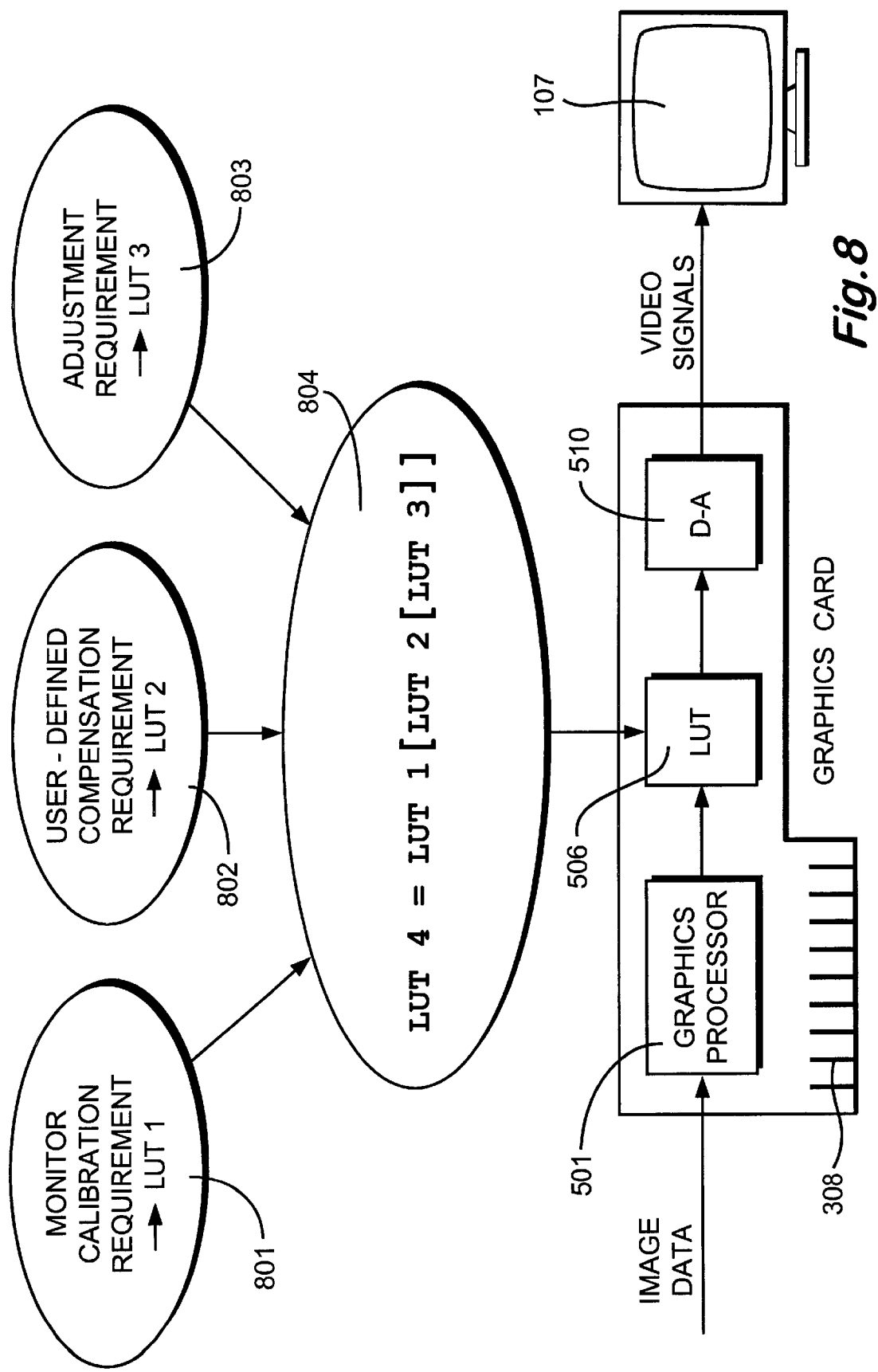
FIG. 8 summarises the step of defining gamma correction for a monitor, shown in FIG. 6, in accordance with the present invention, including defining a monitor calibration requirement, a user-defined compensation requirement, an adjustment requirement and a combining process.

Step 604 for defining gamma correction for the monitor, shown in FIG. 6, is detailed in FIG. 8. A monitor calibration requirement 801 is defined as data in the first look-up table LUT1 405, shown in FIG. 4. A user-defined compensation requirement 802 is defined in the second look-up table LUT2 406. An adjustment requirement 803 is defined in a third look-up table LUT3 407. A combining process 804 combines requirements defined by the contents of LUT1, LUT2 and LUT3 and generates data that is temporarily stored in LUT4 408. This data is then supplied as configuration data for the hardware LUT 506 in the graphics card 308. In an alternative embodiment, LUT4 is not created, and data generated as a result of combining LUT1, LUT2 and LUT3 is supplied directly to the graphics card to configure the hardware LUT 506.

Each of LUT1, LUT2 and LUT3 comprises three LUTs, one each for red, green and blue, although this is only strictly necessary when red, green and blue characteristics differ. This is the case for the monitor calibration requirement 801.

Figure 9:
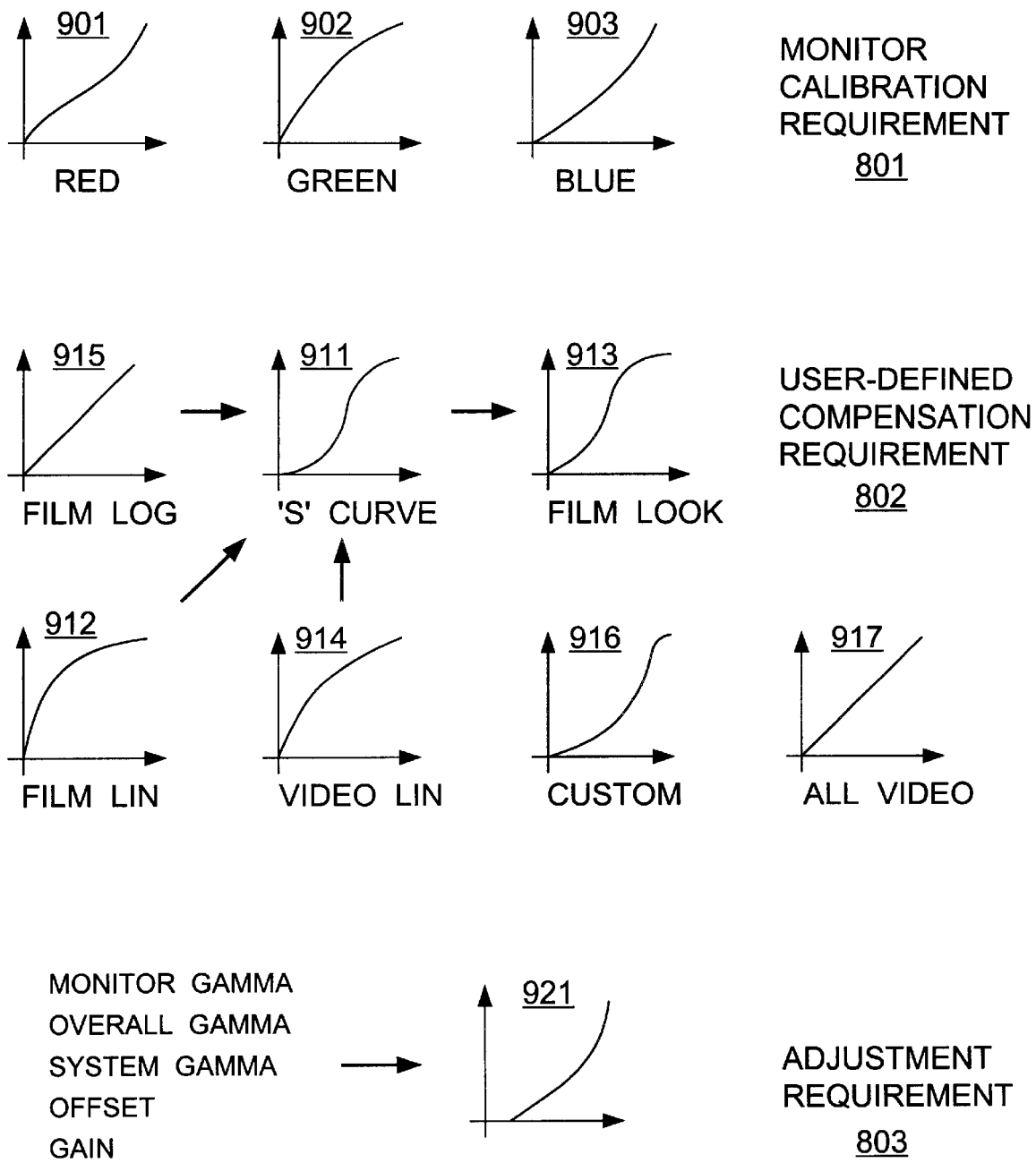
FIG. 9 details characteristics of the requirements shown in FIG. 8.

The monitor calibration requirement 801 compensates for irregularities in the monitor's red, green and blue intensities. These irregularities occur as a result of component ageing and changes in ambient conditions. A characteristic is determined for each of the red, green and blue electron guns, as is shown in FIG. 9 at 901, 902 and 903. These requirements are determined using an automated calibration procedure that measures the intensities of light emitted by the screen phosphors of the monitor 107 under various different conditions of color and luminance. These characteristics are determined empirically and are defined in the form of compensating tables of data 901, 902 and 903. These tables define the red, green and blue tables of LUT1 405.

The user-defined compensation requirement 802 is selected from multiple predetermined compensation characteristics, selected by the user. A first table 911 has an 'S' shaped curve. This is the characteristic of an uncompensated film print, developed from an uncompensated negative. It includes characteristics of both the film camera 101 and the film recorder 109. Thus, when a film print is scanned using the film scanner 102 and converted into digital form without any gamma compensation, the 'S' curve table 911 represents the intensity distortions that need to be introduced into a gamma-neutral system if the film look is to be simulated correctly for film that has been digitized without any gamma compensation.

If compensation for film gamma has been applied during digitization by the film scanner 102, then the 'S' shape table must be superimposed upon a linear to logarithmic conversion table 912. The result of this combination is a film look-up table 913, having a distorted 'S' shape. Table 913 is then considered as the user-defined compensation characteristic. Linear format video may also be given a film look. However, because the linear video format has an inherent gamma pre-distortion, a different table 914 is used. This is combined with the 'S' table 911 to give the film look table 913 that will be used for video input.

When a logarithmic, uncompensated, digitized film input is used, the table that is combined with the 'S' table 911 is a straight line 1:1 table 915. Combination of table 911 with any of the three input format tables 912, 913 or 914 is given by the relation:

FILM_LOOK_LUT[x]=S_CURVE_LUT[[INPUT_LUT[x]]

The value of x is varied until all table values are filled, and interpolation may be used to ensure monotonicity of the final resulting LUT 913.

Film look is dependent upon the 'S' curve LUT 911 being appropriate to the film chemistry of the particular film stock that is being used. Since this will vary from manufacturer to manufacturer, and depending upon the laboratory where the film is developed, a custom film look LUT 916 option is provided. The contents of this LUT are copied from user-specified data from measurements of actual film characteristics. Using custom LUT 916, it is possible to apply the invention to any type of film stock. In many applications, film look is not desirable, or the clips that are being edited and processed are destined for video, in which case an all video LUT 917 is provided. This has a neutral gamma characteristic.

The user-defined compensation characteristic 802 is given by any of the three tables 913, 916 or 917. If the film look table 913 is being used, this will have been created by combining the 'S' shape table 911 with any one of tables 915, 912 or 914, depending on the input format and source of the image data that is being processed.

When the table 913, 916 or 917 has been selected, the table data is copied into LUT2 as three identical red, green and blue tables. In an alternate embodiment, it is possible that the tables 911 to 915 may provide separate control over red, green and blue components, in which case selection of this option will result in non-identical red, green and blue curves being transferred to LUT2.

The third requirement is the adjustment requirement 803. The adjustment requirement is a table of data derived from several parameters. These parameters are the monitor gamma, usually 2.5, the overall gamma usually 1.5, the system gamma, usually 1.7, an offset value and a gain value. Monitor gamma is fixed. However, other parameters may be varied, depending upon several factors. For example, several of these settings may vary depending on the ambient lighting conditions of the room in which the monitor 107 is located. Various calibration procedures may be performed in order to ensure optimal settings for parameters such as gain and offset, so that the user of the system can be assured that the results that are being viewed on the monitor are as close as possible to those that will be seen in the intended environment, such as the theater 112.

The combination of these parameters results in an adjustment requirement, defined as a curve in a table 921. Data for this requirement is then copied from the table 921 into the red, green and blue tables of LUT3.

In combination, the requirements 801, 802 and 803 determine the contents of a transformation LUT 506 which, when applied to image data, results in the display of images on the monitor having an appearance substantially in accordance with the same images when they are subsequently displayed in the theater 112.

The monitor calibration requirement 801 may be considered as a first gamma requirement. The user-defined compensation requirement 802 may be considered as a second gamma requirement, and the first and second gamma transformations are defined in response to these requirements. These transformations are represented by tables of data 405 and 406. The first and second transformations are combined by the combining process 804 to define the data contents of the look-up table 506 in the graphics card 308, so that images displayed on a monitor are transformed in response to the compensation requirement but not the monitor calibration requirement.

The first gamma transformation removes unwanted transformations inherent in the monitor's electronic circuits while the second gamma transformation modifies image data to match its appearance on film even though it is being displayed on a monitor. An adjustment requirement, affected possibly by multiple parameters including system gamma, may also be included, thereby ensuring that the overall gamma of the image processing system is correct.

Figure 10:
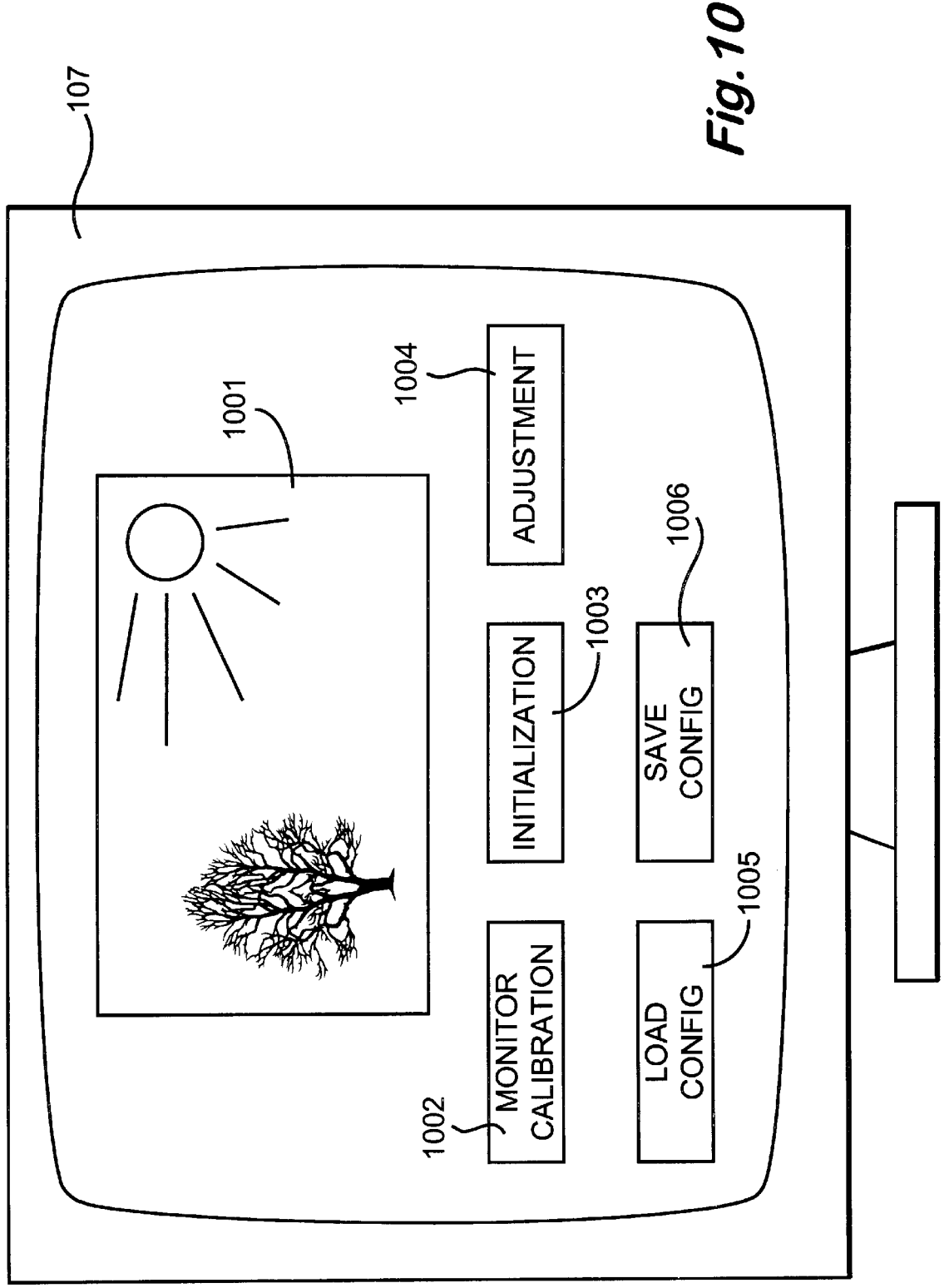
FIG. 10 illustrates a graphical user interface presented to a user when performing the step of defining gamma calibration for a monitor shown in FIG. 6.

The user interface displayed on the monitor 107 at step 604 is illustrated in FIG. 10. An image 1001 is displayed in the top part of the display area to show the effect of changes made during the definition of gamma correction parameters. The monitor also displays soft buttons for monitor calibration 1001, initialization 1003 and adjustment 1004. These enable the user to define requirements 801, 802 and 803 respectively. A load configuration button 1005 enables the user to load previously saved configurations of the requirements 801, 802 and 803. A save configuration button 1006 enables the user to save the current configuration. This arrangement permits one or several users to set multiple definitions for monitor gamma correction, which may be saved or recalled when required.

Figure 11:
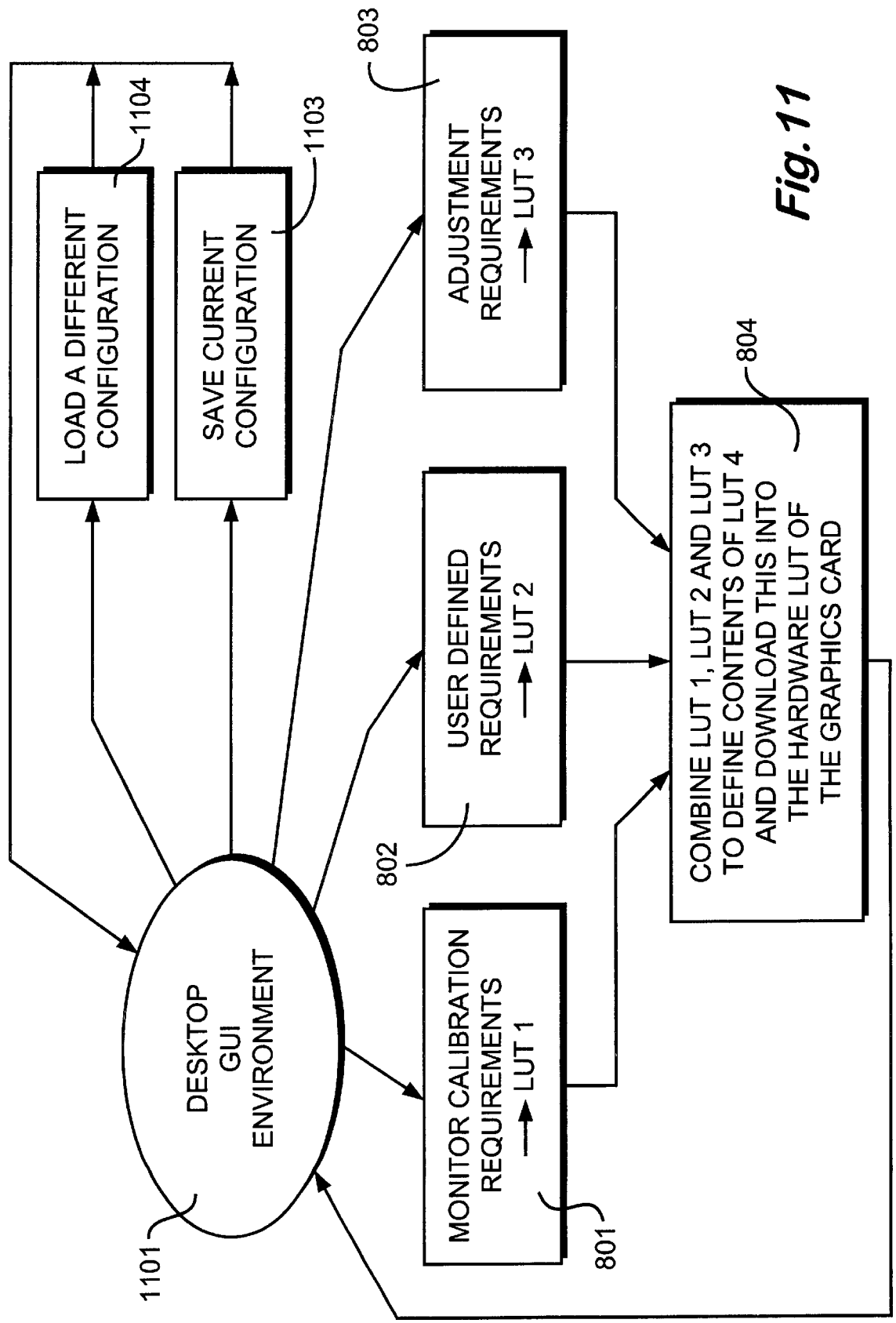
FIG. 11 summarises graphical user interface operations performed in response to user interactions with the interface shown in FIG. 10.

A state diagram representing interaction of the user with the interface shown in FIG. 10 is shown in FIG. 11. The desktop graphical user interface (GUI) environment receives user-interface event signals from the operating system 401 in response to user operation of the keyboard 205 or the graphics tablet 204. The desktop environment 1101 determines the context of events received, and selects an appropriate action. A dialog for defining monitor calibration requirements 801 is initiated in response to pressing soft button 1002. A dialog for defining user-defined requirements is initiated in response to pressing soft button 1003 and a dialog for defining adjustment requirements is initiated in response to pressing soft button 1004. After any of processes 801, 802 or 803 are completed, process 804 is performed, where changes in the definition of monitor gamma correction are downloaded into the hardware LUT 506 in the graphics card. In practice, once a dialog for either of processes 802 or 803 has been initiated, the system will proceed to loop through process 802 or 803, followed by process 804, thereby updating the display in real time, until the user decides to commit to the changes that have been made.

As a result of pressing soft buttons 1005 or 1006, dialogs for loading or saving the present configuration are initiated at steps 1104 and 1105 respectively. These dialogs include the selection or definition of a convenient descriptive name for a configuration. It is also possible to select individual requirements stored as part of several different configurations, and combine them to form a new configuration.

Figure 12:
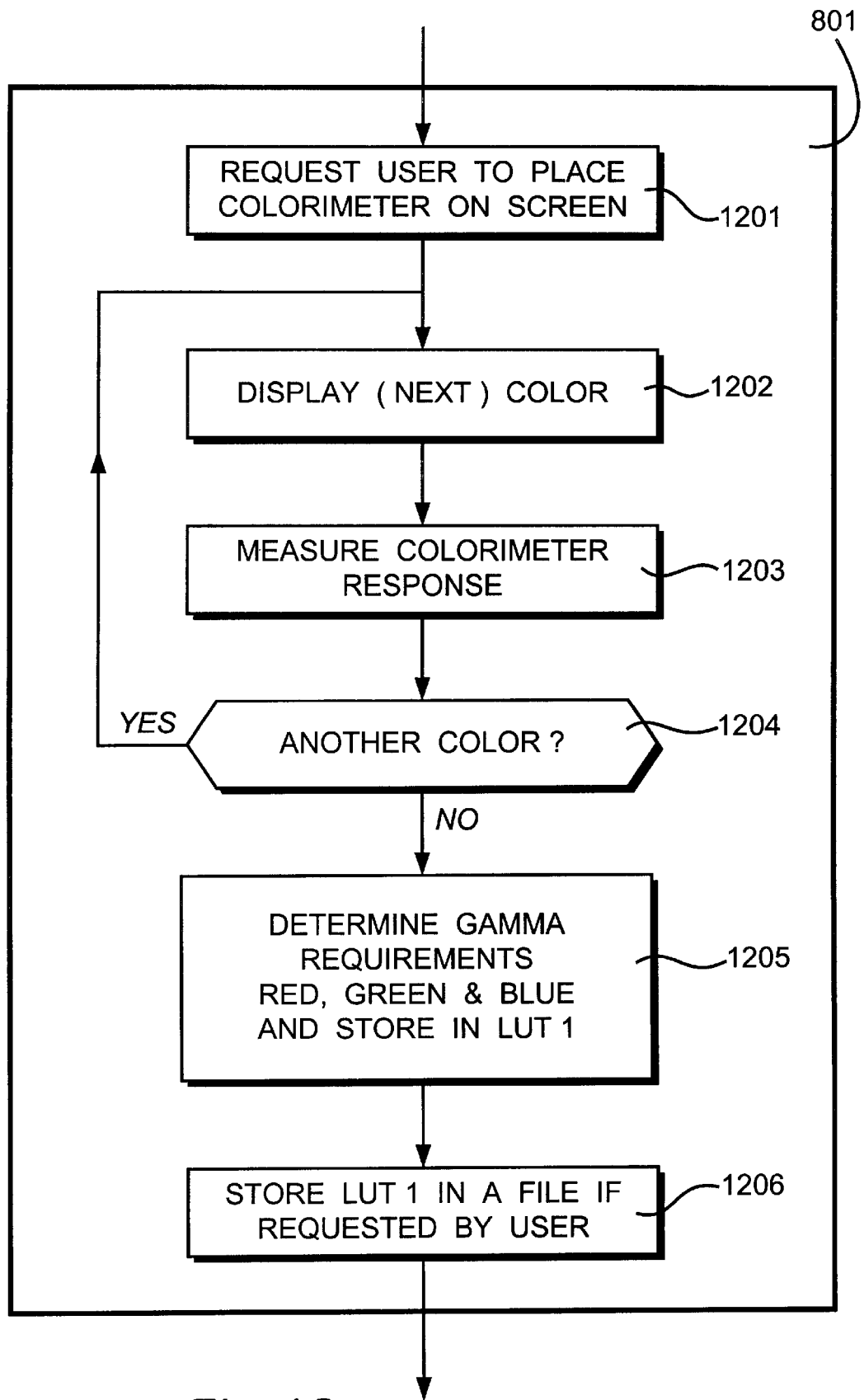
FIG. 12 details operations performed while defining the monitor calibration requirement shown in FIG. 8.

Steps performed by the computer 202 when defining monitor calibration requirements 801 are detailed in FIG. 12. At step 1201 a message is displayed requesting the user to place the calorimeter 206 in the centre of the monitor's screen. The calorimeter 206 has a suction pad and a light sensor. The suction pad fixes the base of the colorimeter to the monitor screen, and the light sensor converts light intensities into an electrical signal. A suitable calorimeter is the X-Rite DTP-92. Detailed information is available at http://www.xrite.com. At step 1202 the first of a predetermined sequence of colors is displayed on the monitor. At step 1203 the calorimeter response is measured. The colorimeter converts the light energy arriving at its sensor into an electrical signal, which is then quantified by an analog to digital converter. The output of the analog to digital converter is supplied in a serial format to the input/output circuit 310 in the computer 202, which then stores this measurement value temporarily. At step 1204 a question is asked as to whether another color should be displayed. If so, control is directed to step 1202 and the next color is selected. After all of the colors have been displayed, control is directed to step 1205. At this point the data accumulated from the color measurements is analysed to determine gamma requirements expressed as correction tables for red, green and blue color components. These are then stored as red, green and blue tables in LUT1. At step 1206 the user may optionally store the calibration data in a file.

The sequence described with reference to FIG. 12 is appropriate for Silicon Graphics (™) monitors that are used with the colorimeter 206. However, in a different embodiment, a Barco (™) monitor may be used, having built-in detection circuitry. When this type of monitor is used, it is possible to perform an iterative process of calibration, where the colors displayed on the monitor's screen are selected on the basis of calibration results from earlier times in the calibration cycle. In this way, it is possible to identify non-linearities in the monitor's gamma characteristic by a process of convergence. Information on Barco monitors is available from http://www.barco.com.

Source code for the combining process 804 is shown in FIG. 13. Each LUT comprises red, green and blue tables each having 256 data locations. An output LUT is generated for each of the red, green and blue component tables in turn. Source code for downloading the resulting combined LUT 408 to the graphics hardware LUT 506 is shown in FIG. 14. This transfer is complicated by the fact the, although the hardware LUT has only two hundred and fifty-six locations, the operating system 401 considers it as having 65536. Thus, the same data value is supplied to 256 consecutive locations in order to make certain that the hardware LUT 506 is updated correctly. On other graphics processing systems, each LUT may have one thousand and twenty-four or four thousand and ninety-six entries, and so the image processing instructions 402 may interrogate the system at start up and perform necessary arithmetic procedures to ensure that maximum accuracy is maintained.

The source code in FIGS. 13 and 14 is used to generate the instructions responsible for implementing process 804. Process 804 is itself part of the Inferno (™) digital effects and editing instructions 402, although it may be supplied as a separate instruction module or as part of another application. The instructions supplied on CD ROM 600 therefore include an embodiment of the invention, as many different types of hardware system can be enabled to implement the invention when supplied with suitable instructions.

Suitable instructions may be in the form of a pre-compiled executable sequence of instructions, an encoded compressed sequence of instructions for direct installation on the hard disk 312, or in the form of source code requiring compilation using commonly available compiler tools.

It will be understood that the methods and apparatus described herein refer to a system in which a plurality of gamma requirements, expressed in the form of data in look-up tables, are combined to form data in a single look-up table that transforms image data in real time. However, look-up tables are capable of storing arbitrarily shaped transformations. It will therefore be understood that gamma requirements referred to herein and elsewhere can include requirements that go beyond the simple gamma relationship given by y=x ^ gamma (x raised to the power of gamma). An example of this is the 'S' curve 911, which may be considered to be a gamma characteristic for the purposes of the invention, even though the 'S' shape does not arise from a simple exponential relationship. A gamma format or gamma requirement stored in a look-up table may include an offset value, a gain value, or any requirement including a non-linear gain characteristic, optionally combined with additional characteristics for the simplification or enhancement of various aspects of an image processing system, that can be defined in the form of a look-up table.

What is claimed is:

1. Apparatus for processing image data, comprising instruction storage means, central processing means and graphical processing means, said graphical processing means being arranged to receive image data and display resulting images on a color monitor, said graphical processing means includes look-up means for transforming the gamma format of image data supplied to it, wherein said color monitor requires a first gamma transformation to satisfy a calibration requirement, and said image data requires a second gamma transformation to satisfy a compensation requirement, said instruction storage means including instructions for said central processing means to perform the steps of combining said first and second transformations to define transformation data in said look-up means, and supplying images to said look-up means such that images displayed on said monitor are transformed in response to said second gamma transformation but not said first gamma transformation.

2. Apparatus for processing image data, comprising instruction storage means, central processing means and graphical processing means, said graphical processing means being arranged to receive image data and display resulting images on a color monitor, said graphical processing means includes look-up means for transforming the gamma format of image data supplied to it, wherein said color monitor requires a first gamma transformation to satisfy a calibration requirement, said image data requires a second gamma transformation to satisfy a compensation requirement, and said image data requires a third gamma transformation to satisfy an overall gamma requirement, said instruction storage means including instructions for said central processing means to perform the steps of combining said transformations to define transformation data in said look-up means, and supplying images to said look-up means such that images displayed on said monitor are transformed in response to said second and third gamma transformations but not said first gamma transformation.

3. Apparatus according to any of claims 1 to 2, wherein said combining step is performed by executing instructions stored in said storage means such that said central processing means performs steps of:

addressing a table representing a first gamma transformation requirement to generate first data, addressing a table representing an additional gamma transformation requirement with said first data to generate next data, and addressing any additional tables representing respective additional transformation requirements with said next data to generate new next data until all said gamma transformation requirements have been satisfied, and finally, supplying said next data or said new next data as data for said look-up means in said graphical processing means.

4. Apparatus according to any of claims 1 to 2, wherein said look-up means is addressed by image data, and said look-up means has its data output supplied via input/output multiplexing means to digital to analog means for said monitor.

5. Apparatus according to claim 1 or claim 2, wherein said second gamma transformation is a gamma compensation required for film.

6. Apparatus according to any of claims 1 to 2, wherein a transformation is defined by red, green and blue look-up tables.

7. Apparatus according to any of claims 1 to 2, wherein said graphical processing means includes hardware look-up means comprising red, green and blue tables for the dedicated purpose of receiving address signals representing image data and transforming said address signals in accordance with transformation data for red, green and blue color channels, said look-up means being multiplexed such that transformation data may be transferred into said look-up means via a bi-directional data bus.

8. An image processing apparatus according to 7, including main memory means, wherein said main memory means is configurable by said central processing means in response to instructions on said instruction storage means to perform the steps of:
   load look-up tables in said main memory with said gamma transformations, and
   combine data from said look-up tables in main memory to generate data for said hardware look-up.

9. Apparatus according to any of claim 1 to 2, including main memory means, wherein said look-up means is implemented in said main memory, and image data is transformed by said look-up means in main memory before transmission to said graphical processing means.

10. A method of processing image data, in which an image processing system comprises instruction storage means, central processing means and graphical processing means, said graphical processing means being arranged to receive image data and display resulting images on a color monitor, said graphical processing means including look-up means for transforming the gamma of image data supplied to it, wherein
   said color monitor requires a first gamma transformation to satisfy a calibration requirement, and
   said image data requires a second gamma transformation to satisfy a compensation requirements, comprising the steps of
      combining said first and second transformations to define transformation data in said look-up means, and
      supplying images to said look-up means such that images displayed on said monitor are transformed in response to said second gamma transformation but not said first gamma transformation.

11. A method of processing image data, in which an image processing system comprises instruction storage means, central processing means and graphical processing means, said graphical processing means being arranged to receive image data and display resulting images on a color monitor, said graphical processing means including look-up means for transforming the gamma format of image data supplied to it, wherein
   said color monitor requires a first gamma transformation to satisfy a calibration requirement,
   said image data requires a second gamma transformation to satisfy a compensation requirement, and
   said image data requires a third gamma transformation to satisfy an overall gamma requirement comprising steps of
      combining said transformations to define transformation data in said look-up means, and
      supplying to said look-up means such that images displayed on said monitor are transformed in response to said second and third gamma transformations but not said first gamma transformation.

12. A method according to any of claims 10 to 11, wherein said combining step is performed by executing instructions stored in said storage means such that said central processing means performs steps of:
   addressing a table representing a first transformation requirement to generate first data,
   addressing a table representing an additional gamma transformation requirement with said first data to generate next data, and
   addressing any additional tables representing respective additional transformation requirements with said next data to generate new next data until all said gamma transformation requirements have been satisfied, and finally,
   supplying said next data or said new next data as data for said look-up means in said graphical processing means.

13. A method according to any of claims 10 to 11, wherein said step of supplying images to said look-up means results in addressing data in said look-up means, and said addressed data is supplied as gamma-corrected image signals to said monitor.

14. A method according to any of claims 10 to 11, including storing data representing a plurality of said requirements in response to a user's request using a graphical user interface presented to said user on said monitor.

15. A method according to any of claims 10 to 11, including retrieving data representing a plurality of said requirements in response to a user's request using a graphical user interface presented to said user on said monitor.

16. A method according to claim 10 or 11, wherein said calibration requirement has been determined by a calibration process comprising steps of:
   requesting a user to place a colorimeter on the screen of said monitor,
   supplying signals to said monitor representing a color and luminance,
   receiving measurements from said colorimeter representing said color and luminance, and
   determining a calibration requirement is response to a comparison between said measurements and representations of said monitor signals.

17. A method according to claim 10 or claim 11, wherein said second gamma transformation is a gamma compensation required for film.

18. A method according to any of claims 10 to 11, wherein a transformation is defined by red, green and blue look-up tables.

19. A computer-readable medium having computer-readable instructions executable by a computer configured as part of an image processing system, said computer comprising instruction storage means, central processing means controllable from said instruction storage means and graphical processing means, said graphical processing means being arranged to receive image data and display resulting images on a color monitor, said graphical processing means including look-up means for transforming the gamma format of image data supplied to it, wherein
   said color monitor requires a first gamma transformation to satisfy a compensation requirements,
   said image data requires a second gamma transformation to satisfy a compensation requirement, such that said central processing mean performs the steps of:
  combining said first and second transformations to define transformation data in said look-up means, and
  supplying images to said look-up means such that images displayed on said monitor are transformed in response to said second gamma transformation but said first gamma transformation.

20. A computer-readable medium having computer-readable instructions executable by a computer configured as part of an image processing system, said computer comprising instruction storage means, central processing means controllable from said instruction storage means and graphical processing means, said graphical processing means being arranged to receive image data and display resulting images on a color monitor, said graphical processing means including look-up means for transforming the gamma format of image data supplied to it, wherein
  said color monitor requires a first gamma transformation to satisfy a calibration requirement,
  said image data requires a second gamma transformation to satisfy a compensation requirement, and
  said image data requires a third gamma transformation to satisfy an overall gamma requirement,
  such that said central processing means performs the steps of:
    combining said transformations to define transformation data in said look-up means, and
    supplying images to said look-up means such that images displayed on said monitor are transformed in response to said second and third gamma transformations but not said first gamma transformation.

21. A computer-readable medium according to any of claims 19 to 20, wherein said combining step is performed by executing instructions stored in said storage means such that said central processing means performs steps of:
  addressing a table representing a first gamma transformation requirement to generate first data,
  addressing a table representing an additional gamma transformation requirement with said first data to generate next data, and
  addressing any additional tables representing respective additional transformation requirements with said next data to generate new next data until all said gamma transformation requirements have been satisfied, and finally,
  supplying said next data or said new next data as data for said look-up means in said graphical processing means.

22. A computer-readable medium according to any of claims 19 to 20, wherein said step of supplying images to said look-up means result in addressing data in said look-up means, and said addressed data is supplied as gamma-corrected image signals to said monitor.

23. A computer-readable medium according to any of claims 19 to 20, including storing data representing a plurality of said requirements in response to a user's request using a graphical user interface presented to said user on said monitor.

24. A computer-readable medium according to any of claims 19 to 20, including retrieving data representing a plurality of said requirements in response to a user's request using a graphical user interface presented to said user on said monitor.

25. A computer-readable medium according to claim 19 or 20, wherein said calibration requirement has been determined by a calibration process comprising steps of:
  requesting a user to place a colorimeter on the screen of said monitor,
  supplying signals to said monitor representing a color and luminance,
  receiving measurements from said colorimeter representing said color and luminance, and
  determining a calibration requirement is response to a comparison between said measurements and representations of said monitor signals.

26. A computer-readable medium according to claim 19 or 20, wherein said second gamma transformation is a gamma compensation required for film.

27. A computer-readable medium according to any of claims 19 to 20, wherein a transformation is defined by red, green and blue look-up tables.

* * * * *

UNITED STATES PATENT AND TRADEMARK OFFICE
CERTIFICATE OF CORRECTION

PATENT NO.     : 6,671,000 B1
DATED          : December 30, 2003
INVENTOR(S)    : Laurence Cloutier It is certified that error appears in the above-identified patent and that said Letters Patent is hereby corrected as shown below:

<u>Column 12,</u>
Line 63, "requirements" should read -- requirement --.

<u>Column 13,</u>
Line 1, "mean" should read -- means --.

<u>Column 14,</u>
Line 10, "result" should read -- results --.

Signed and Sealed this

Twenty-fifth Day of May, 2004

JON W. DUDAS
*Acting Director of the United States Patent and Trademark Office*